United States Patent
Guillou et al.

(10) Patent No.: US 7,460,720 B2
(45) Date of Patent: Dec. 2, 2008

(54) METHOD AND DEVICE FOR DEFINING QUALITY MODES FOR A DIGITAL IMAGE SIGNAL

(75) Inventors: Jeanne Guillou, Rennes (FR); Maryline Clare, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 10/798,308

(22) Filed: Mar. 12, 2004

(65) Prior Publication Data

US 2004/0184665 A1 Sep. 23, 2004

(30) Foreign Application Priority Data

Mar. 21, 2003 (FR) .................................. 03 03499

(51) Int. Cl.
*G06K 9/36* (2006.01)
*H04N 7/12* (2006.01)
(52) U.S. Cl. .................................. 382/233; 348/384.1
(58) Field of Classification Search ........................ None
See application file for complete search history.

(56) References Cited

U.S. PATENT DOCUMENTS

| | | | | |
|---|---|---|---|---|
| 6,668,090 B1 * | 12/2003 | Joshi et al. | .................. | 382/239 |
| 6,785,423 B1 * | 8/2004 | Joshi et al. | .................. | 382/235 |
| 6,885,395 B1 * | 4/2005 | Rabbani et al. | .......... | 348/231.1 |
| 2001/0021223 A1 * | 9/2001 | Andrew | .................. | 375/240.11 |
| 2002/0012471 A1 * | 1/2002 | Nayyar | ........................ | 382/239 |
| 2002/0141650 A1 * | 10/2002 | Keeney et al. | ............... | 382/239 |
| 2003/0018750 A1 | 1/2003 | Onno et al. | .................. | 709/219 |
| 2004/0170331 A1 * | 9/2004 | Henry | ......................... | 382/233 |
| 2004/0184529 A1 | 9/2004 | Henocq et al. | .......... | 375/240.01 |
| 2004/0223650 A1 | 11/2004 | Guillou | ....................... | 382/232 |

FOREIGN PATENT DOCUMENTS

| EP | 1 069 764 A2 | 1/2001 |
|---|---|---|
| EP | 1069764 A2 * | 1/2001 |
| EP | 1 158 774 A2 | 11/2001 |

OTHER PUBLICATIONS

Muller "Improving and Managing Multimedia Performance over TCP/IP Nets," International Journal of Network Management, pp. 356-367 1998.*
Christopoulos "The JPEG2000 Still Image Coding System: An Overview," IEEE Transactions on Consumer Electronics, vol. 46. No. 4, pp. 1103-1127 2000.*
T. Girard, "PhotoShop 5.5—Save for Web Tool—User's Guide," Adobe PhotoShop, pp. 1-22, 2001 'Online! XP-002261429,http://www.tomgirard.com/pdf_files/sfw_ps55. pdf.
N.J. Muller, "Improving and Managing Multimedia Performance over TCP/IP Nets," International Journal of Network Management, pp. 356-367 1998.
Anonymous, "Adobe PhotoShop 5.5," Adobe, 'Online, pp. 1-15, XP002261430, 1999, http://www,adibe.con/jp/products/photoshop55/pdfs/phs55ofh.pdf.

* cited by examiner

*Primary Examiner*—Bhavesh M Mehta
*Assistant Examiner*—Charles Kim
(74) *Attorney, Agent, or Firm*—Fitzpatrick, Cella, Harper & Scinto

(57) ABSTRACT

This method of defining qualities for a digital image signal encoded beforehand consists of defining a predetermined number of quality modes each corresponding to at least one decoding parameter of the digital signal, this definition being made on the basis of rate information provided via a graphical interface and quality perception information provided via the visualization of the decoded digital signal.

14 Claims, 9 Drawing Sheets

METHOD AND DEVICE FOR DEFINING QUALITY MODES FOR A DIGITAL IMAGE SIGNAL

The present invention relates to a method and a device for defining quality modes for a digital image signal.

It lies in the field of the manipulation of images in the creation of content for applications of client-server type.

It is described here more particularly in its application to digital signals representing images encoded according to the JPEG2000 standard. It makes it possible in particular to associate with a JPEG2000 image three quality modes known as "high", "normal" and "low", corresponding to three quality layer values.

Assuming that a content creator uses, for example, software of the Macromedia FlashMX type, the object of the invention is to propose tools to the creator enabling him to define, for a given JPEG2000 image, three quality modes ("high", "normal" and "low") which will be the only ones available for the final user of the image. The final user, in our example, views an animation with software of the Macromedia FlashPlayer type.

Three quality modes are already available in animations of Flash type. Nevertheless, whatever the quality mode chosen, the content of the data transmitted is the same, only the display mode changes. Moreover, Flash animations do not currently contain JPEG2000 images.

In an image format such as the new compression standard JPEG2000, it is possible to decompress an image without recourse to complete decoding of the image. The internal structure of the file, arranged in different quality layers and different resolution levels, indeed makes it possible to decompress the image at a certain resolution and with a given quality. It is thus possible to adapt the volume of data to transfer according to the request of a user, for example according to his choice of number of quality layers. Nevertheless, as a JPEG2000 image can be organized in 32 quality layers, the setting of these parameters by the final user would be too complicated.

The object of the present invention is thus to reduce the number of quality modes provided to the final user by proposing to the content creator tools for defining, for each image and according to his own criteria, three quality modes ("high", "normal" and "low"), and by proposing default values corresponding to a volume of data to transfer which is truly different according to the mode chosen.

The applicant does not presently know of tools making it possible to reduce the number of quality modes proposed to the final user of a JPEG2000 image already encoded, nor tools which enable a content creator to define those quality modes.

There are existing encoders which provide the possibility of selecting parameters of rate or quality, while providing a preview of the image. Nevertheless, in this case, the step of encoding an image is considered and not the use of an encoded image which it is not desired to modify.

Other devices are known making it possible to meet user requests relating to a portion of a JPEG2000 image. These devices for example make it possible to transmit, in addition to the data corresponding to the image portion, information on the quality layers relating to that image portion. Nevertheless information is then transmitted on all the quality layers, without simplification for the final user.

The object of the invention is to remedy the aforementioned drawbacks, by reducing the number of quality modes available for an image, without modifying that image, and by allowing a content creator to define the quality modes according to his own criteria. In addition, default values are proposed, which correspond in each mode to a significant difference in volume of data to transfer for the final user.

The problem solved here is particularly worthwhile in a client-server application context. In this context, images are generally stored on a server which is interrogated by a so-called client system. It is thus possible, by virtue of the invention, to convey over the network the information necessary to offer on the client side, and for the image in course of visualization, the relationship between each quality mode and the associated number of quality layers.

To that end, the present invention provides a method of defining qualities for a digital image signal encoded beforehand, remarkable in that it consists of defining a predetermined number of quality modes each corresponding to at least one decoding parameter of the digital signal, this definition being made on the basis of rate information provided via a graphical interface and perception quality information provided via the visualization of the decoded digital signal.

Thus, the invention provides, for example to a content creator, tools enabling him to define, for a given image, several quality modes according to criteria specific to him (rate, quality, compromise, etc.). These quality modes will be the only ones available for the final user of the image, who will thus have simple quality parameters to manage.

Moreover, the digital signal is not modified. A content creator can thus use the signal for other applications.

In a particular embodiment, the method consists of defining three quality modes, including a so-called "low" quality mode, a so-called "normal" quality mode and a so-called "high" quality mode, each corresponding to a truly different volume of data to transfer to the user.

According to a particular feature, a predetermined number of quality layers is associated with each quality mode. Thus, in an image format such as the compression standard JPEG2000, this makes it possible to decompress the image without completely decoding it, with a particular quality, according to the number of quality layers chosen.

This is because, according to a particular feature, the decoding parameter mentioned above is the number of quality layers.

Each quality mode thus corresponds to the decoding of a predetermined quantity of data representing the digital signal.

According to a particular feature, the method comprises a step consisting of storing the decoding parameters in a file to be transmitted to a final user to deduce therefrom, according to the quality mode chosen by the user, the corresponding decoding parameter. The storage of the decoding parameters thus enables them to be simply and rapidly obtained on decoding the image.

According to a particular feature, the file is in SWF format.

When a predetermined number of quality layers is associated with each quality mode, the method according to the invention may comprise a step of initialization consisting of determining default values of the number of quality layers to be associated with each quality mode, corresponding to mutually distinctly different quantities of data representing the digital signal.

According to a particular feature, the rate information is represented in the form of a graph illustrating the size of the image represented by the digital signal as a function of the number of quality layers.

According to a particular feature, the aforementioned predetermined number of quality layers is represented in the form of a cursor simultaneously with the visualization of the decoded digital signal.

The two preceding features enable concrete visual aid to be provided to a content creator for choosing the parameters linked to each quality mode.

In a particular embodiment, the digital signal is a signal representing an image encoded according to the JPEG2000 standard.

With the same object as that indicated above, the present invention also provides a device for defining qualities for a digital image signal encoded beforehand, remarkable in that it comprises a module for defining a predetermined number of quality modes each corresponding to at least one decoding parameter of the digital signal, this definition being made on the basis of rate information provided via a graphical interface and perception quality information provided via the visualization of the decoded digital signal.

The present invention also relates to a communication apparatus comprising a device as above.

The invention also relates to:
  an information storage means which can be read by a computer or a microprocessor storing instructions of a computer program, making it possible to implement a method as above, and
  a partially or totally removable information storage means which can be read by a computer or a microprocessor storing instructions of a computer program, making it possible to implement a method as above.

The invention also relates to a computer program product loadable into a programmable apparatus and comprising sequences of instructions for implementing a method as above, when that program is loaded and run by the programmable apparatus.

As the particular features and advantages of the device, the communication apparatus, the different storage means and the computer program product are similar to those of the method according to the invention, they are not repeated here.

Other aspects and advantages of the invention will appear from reading the following detailed description of particular embodiments, given by way of non-limiting example. The description refers to the accompanying drawings, in which.

Figure 1:
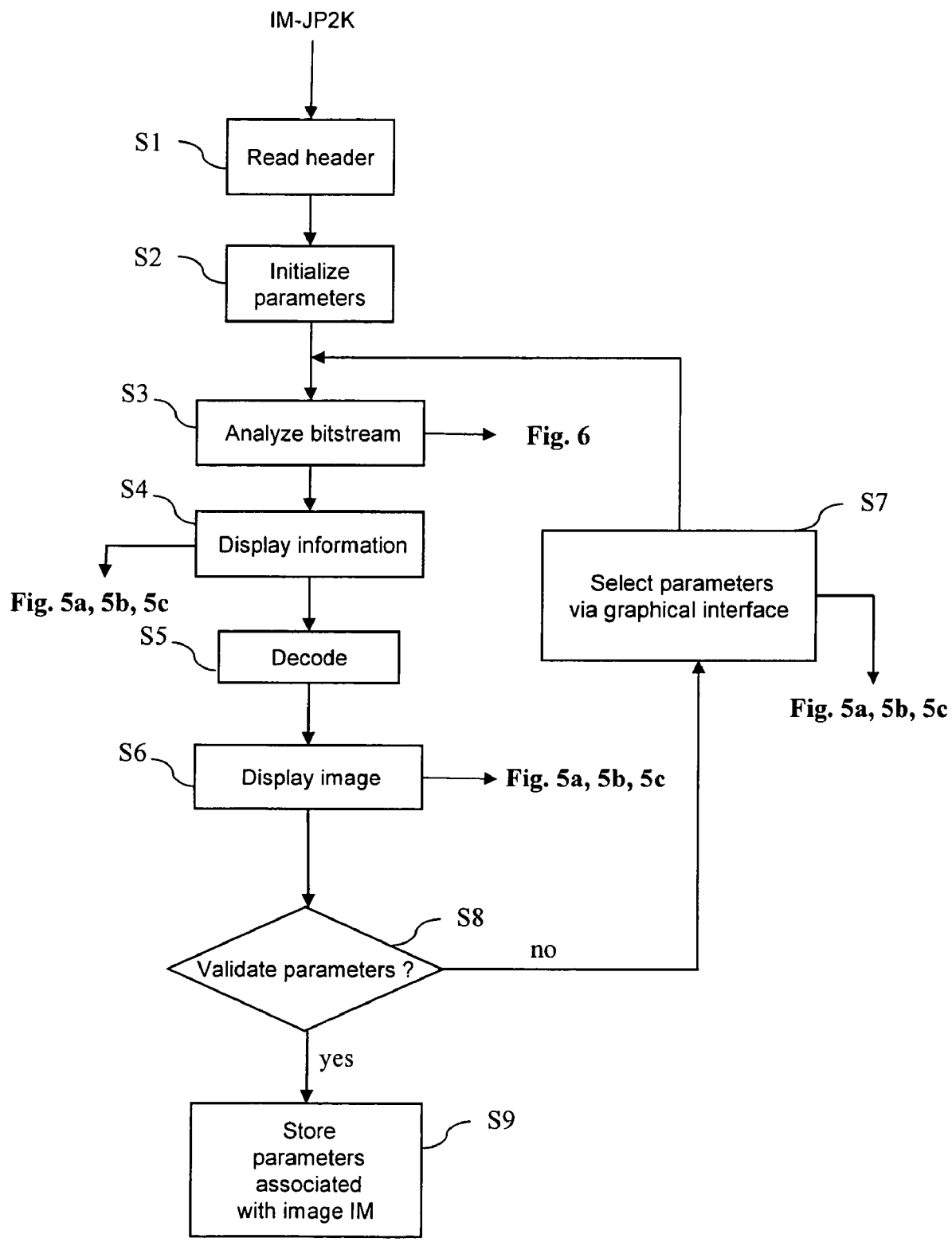
FIG. 1 is a flow diagram illustrating the main steps of a method of defining quality modes according to the present invention, in a particular embodiment.

The different steps illustrated in the flow diagram of FIG. 1 make it possible, for example for a content creator, to choose, for an encoded image, the number of quality layers which will be associated with each quality mode, on the basis of rate information provided via a graphical interface and quality information provided via the display of the image. This succession of steps is executed for example when a content creator imports a JPEG2000 image into a Flash animation.

Figure 3:
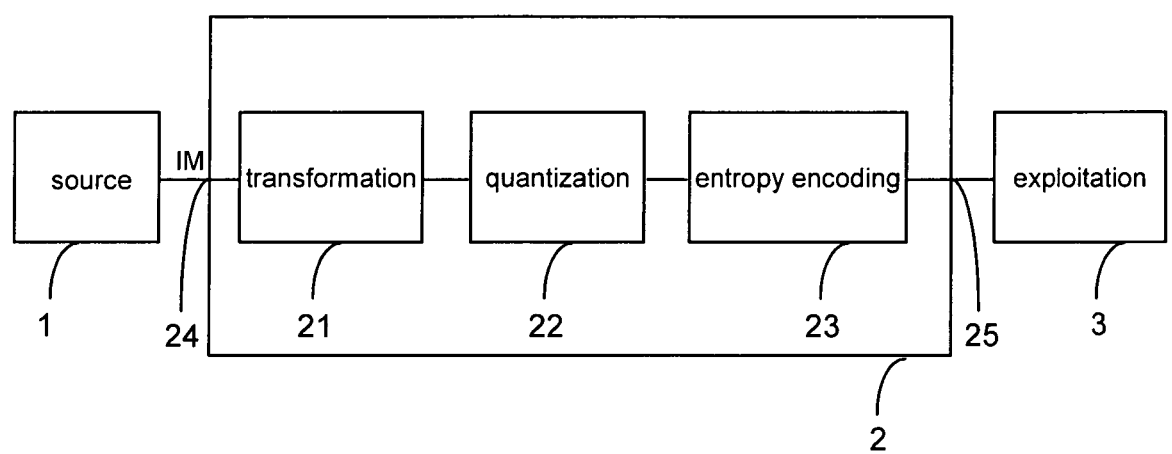
FIG. 3 is a diagram of a conventional device for encoding a digital signal.

It is assumed that we initially have an IM-JP2K image encoded by means of a device such as the device 2 of FIG. 3, described further on.

At a step S1, the header of the image is read, which makes it possible to have information on the encoding of the signal, such as the number of quality layers, the number of resolution levels, and the progression order in the binary stream. The progression order may for example be quality-resolution-component-position, which means that all the data necessary for decoding a quality layer will be placed first in the binary stream, and then all the data for the second quality layer. For each quality layer, the data are organized by resolution, then by component and finally by spatial position.

Then at a step S2, the display resolution R and the quality mode considered are initialized.

Next, a step S3 consists of analyzing the bitstream to obtain information on the rate corresponding to each quality layer of the image for a resolution R. Furthermore, on the first passage at step S3, default values of the number of quality layers to be associated with each quality mode are calculated. This step is detailed further on in relation with FIG. 6.

The following step S4 consists of representing the information supplied by step S3 in graphical form. This step is detailed further on in relation with FIGS. 5a, 5b and 5c.

During the following step S5 the decoding of the image takes place for the display resolution R, the quality mode selected and thus the corresponding quality level. The decoding is known per se and consists of the steps that are the inverse of the encoding performed by the device 2 of FIG. 3: entropy decoding, inverse quantization, and inverse transform.

Figure 5A:
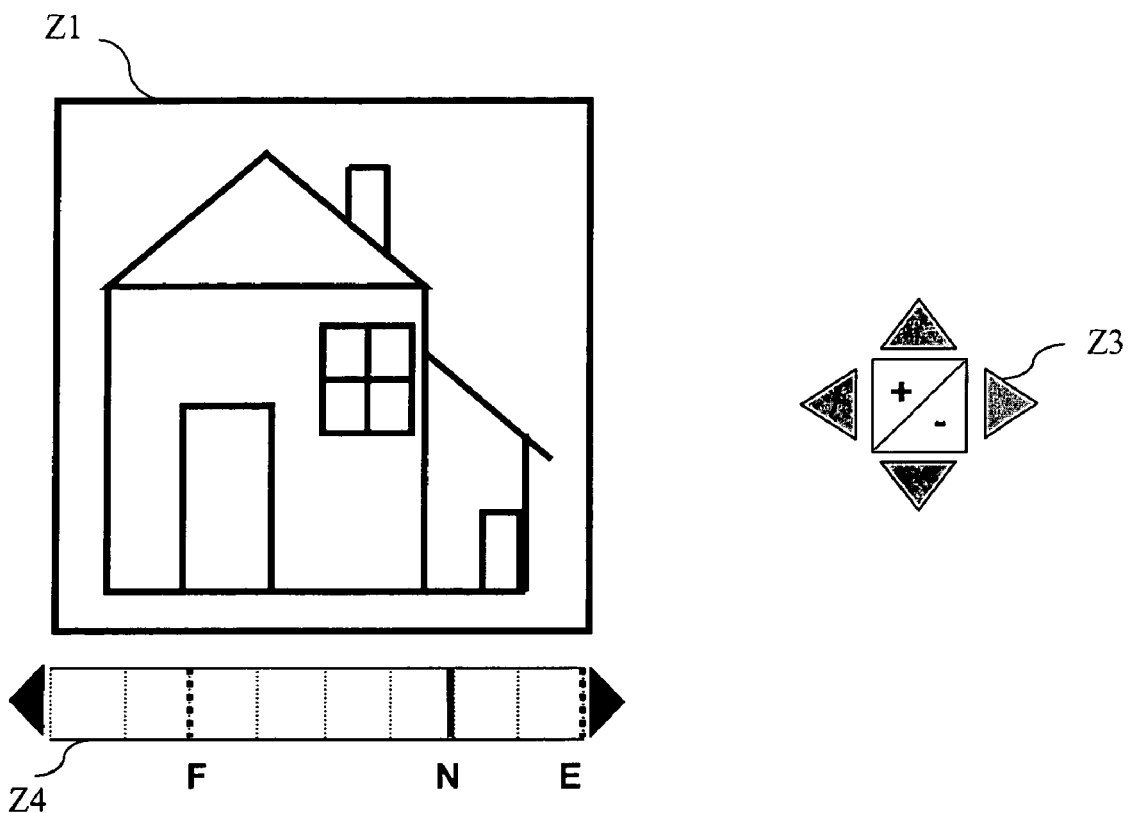
FIGS. 5a, 5b and 5c are diagrams of a graphical interface that can be used in relation to the present invention, in three different situations.
Figure 5A:
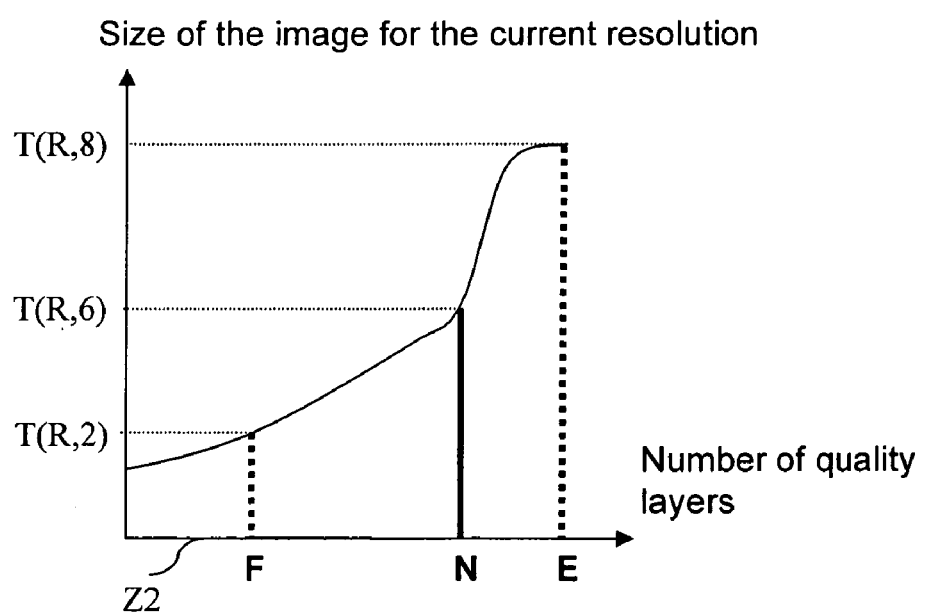
Figure 5B:
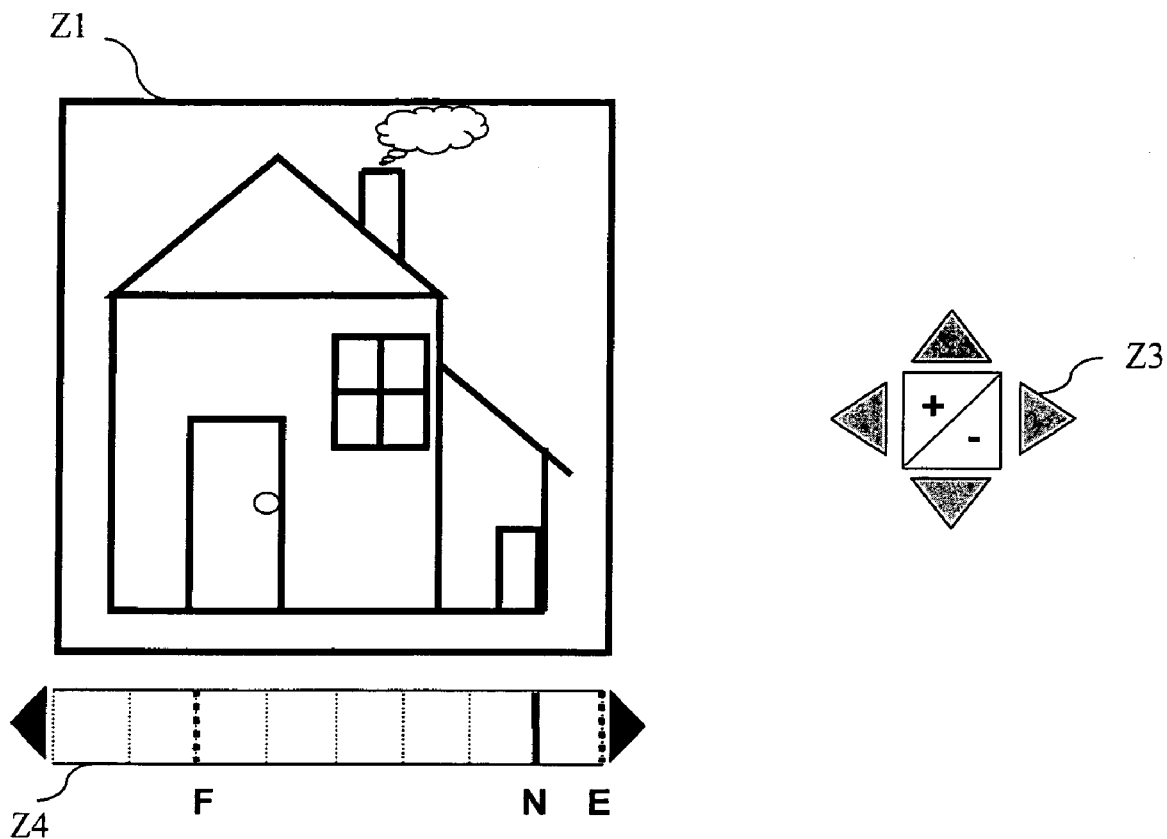
Figure 5B:
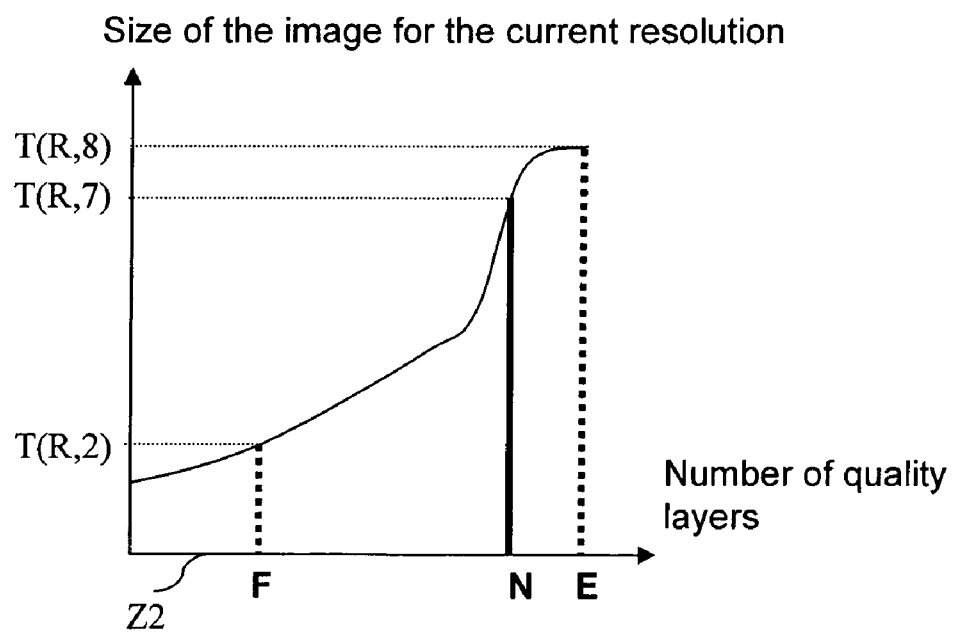
Figure 5C:
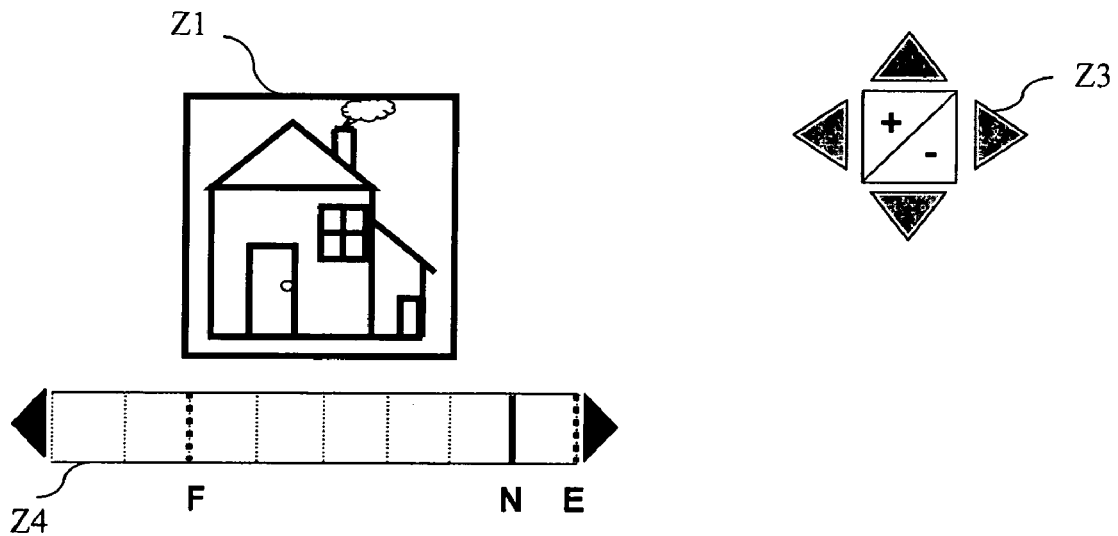
Figure 5C:
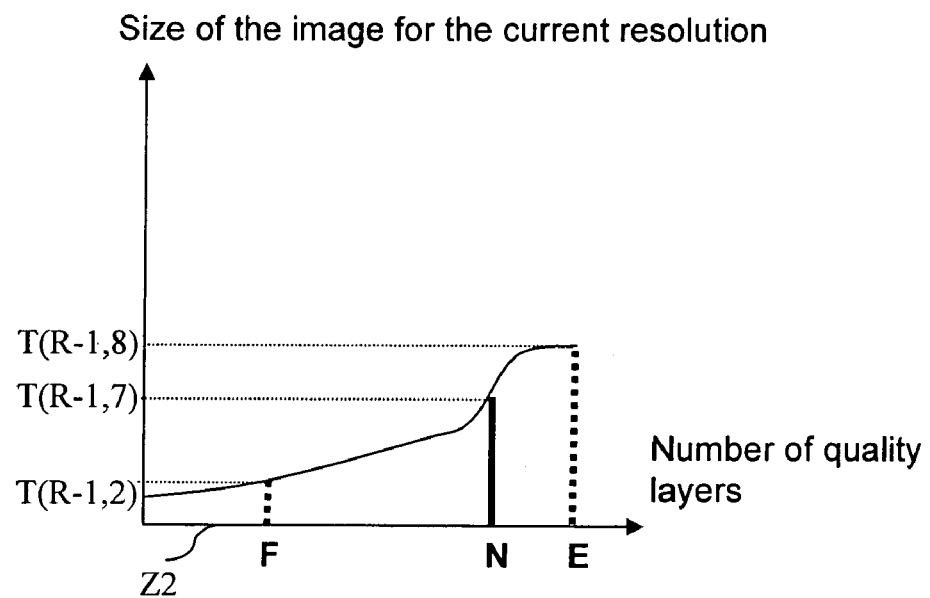

The following step S6 consists of displaying the image using the same parameters (resolution R and selected quality level). This step is illustrated by FIGS. 5a, 5b and 5c described further on.

Next during the test S8 it is considered whether the parameters have been validated, and in particular the number of quality layers associated with each quality mode, for examples by action of the mouse on an action button "validation". If that is not the case, test S8 is followed by a step S7 where the selection or the modification by the content creator takes place, via the graphical interface, of the decoding parameters: resolution R, quality mode and number of quality layers associated, and possibly the position of the image if the resolution of the image is such that the complete image cannot be displayed. This step is detailed further on in relation with FIGS. 5a, 5b and 5c.

If on the other hand the test S8 is positive, the following step S9 consists of recording the parameters associated with the image JP2K, for example in file format ".SWF" if it is a Flash application. Thus, in a client-server context, the final utilization of the file ".SWF" containing the image will be made on the client with the FlashPlayer software; in this case, whatever the quality mode the user requests (normal, low, high), it will be easy to translate his request in terms of quality layers, and for example to use the image exchange protocol JPIP (JPEG2000 Internet Protocol).

Figure 2:
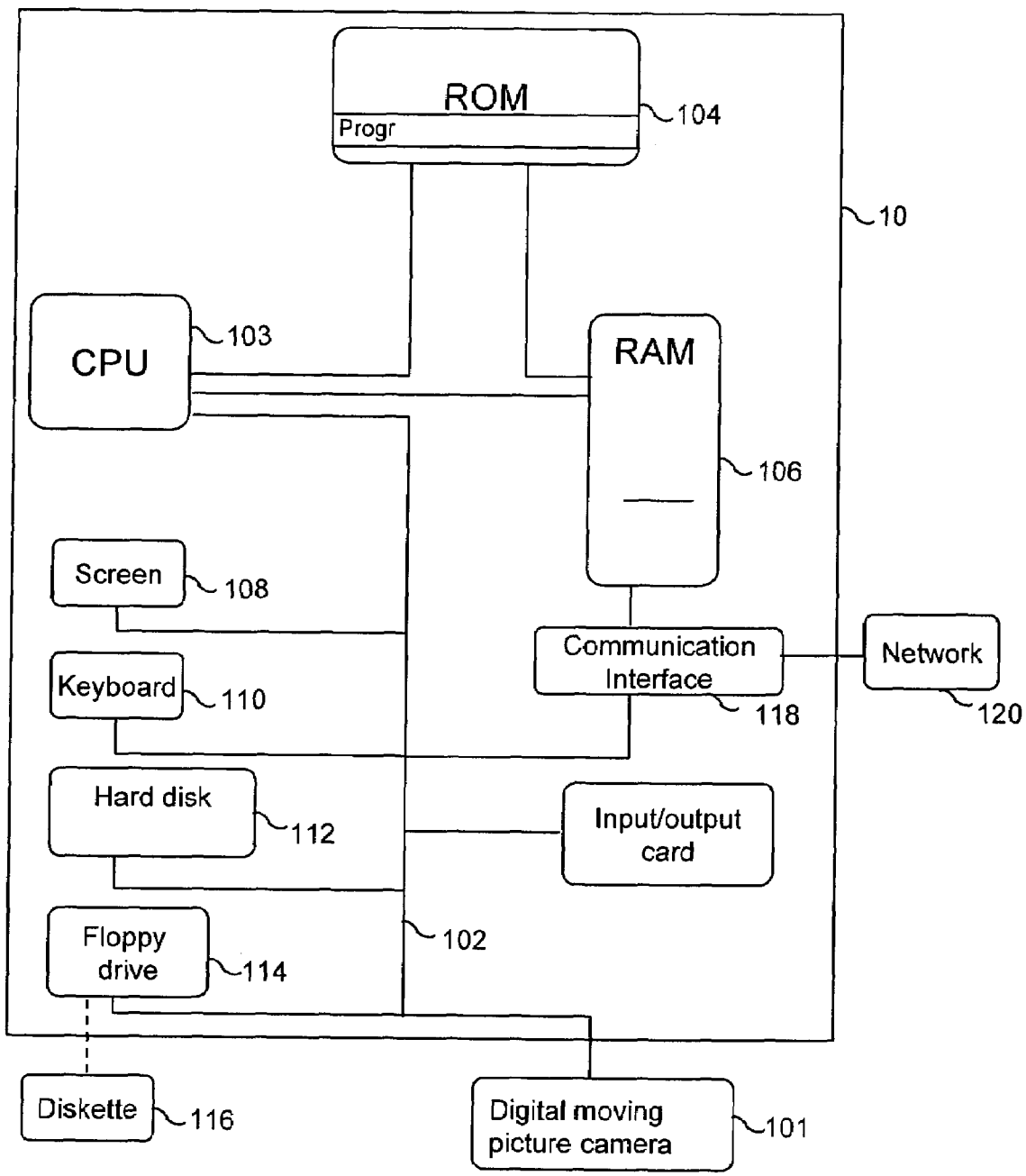
FIG. 2 is a diagram of a device implementing the present invention, in a particular embodiment.

According to the chosen embodiment shown in FIG. 2, a device implementing the invention is for example a microcomputer 10 connected to different peripherals, for example a digital moving picture camera 101 (or a scanner, or any means of acquiring or storing an image) connected to a graphics card and supplying information to be processed according to the invention. In the context of a client-server application, this device may be assimilated to the server.

The device 10 comprises a communication interface 118 connected to a network 120 adapted to transmit compressed digital data, for example to the final user when the invention is applied in the context of a client-server architecture. The device 10 also comprises a storage means 112 such as a hard disk. It also comprises a floppy drive 114. A diskette 116, like the hard disk 112, may contain data compressed in accordance with the invention as well as the code of a computer program enabling the device 10 to implement the invention which, once read by the device 10, will be stored on the hard disk 112. In a variant, the program enabling the device to implement the invention will be able to be stored in read-only memory 104 (for example a ROM). In another variant, the program can be received in order to be stored in an identical fashion to that described previously via the communication network 120.

This same device has a screen 108 making it possible to view the data to be analyzed or to serve as an interface with the user, who will be able to parameterize certain modes of analysis, using the keyboard 110 or any other means (a mouse for example).

The central processing unit 103 (CPU) executes the instructions relating to the implementation of the invention, which are stored in the read-only memory 104 or in the other storage means. On powering up, the quality definition programs stored in a non-volatile memory, for example the ROM 104, are transferred into the RAM (Random Access Memory) 106, which then contains the executable code of the invention, as well as registers for storing the variables necessary for implementing the invention.

Naturally, the diskettes may be replaced by any type of information medium such as CD-ROM, DVD-ROM or memory card. More generally, an information storage means, which can be read by a computer or by a microprocessor, integrated or not into the device, possibly removable, stores a program implementing the method of defining quality modes according to the invention.

A communication bus 102 affords communication between the different elements included in the microcomputer 10 or connected to it. The representation of the bus 102 is not limiting and, in particular, the central unit 103 is liable to communicate instructions to any element of the microcomputer 10 directly or through another element of the microcomputer 10.

FIG. 3 is a diagram of a conventional fixed image encoder. Such an encoder is not necessary for the implementation of the present invention. However, the description of the encoder will enable the structure of the JPEG2000 images analyzed in the invention to be better understood.

In the chosen embodiment shown in FIG. 3, a data encoding device is a device 2 which comprises an input 24 to which a source 1 of non-encoded data is connected.

The source 1 comprises for example a memory means, such as a random access memory, a hard disk, a diskette or a compact disc, for storing non-encoded data, this memory means being associated with a suitable reading means for reading data therein. A means for recording the data in the memory means can also be provided.

It is considered that the data to be encoded are a series of original digital samples representing physical quantities and representing, for example, an image IM.

The source 1 supplies a digital image signal IM to the input of the encoding circuit 2. The image signal IM is a series of digital words, for example bytes. Each byte value represents a pixel of the image IM, here with 256 levels of gray, or a black and white image. The image may be a multispectral image, for example an image of the red-green-blue or luminance and chrominance type. Either the color image is processed in its entirety, or each component is processed in a manner similar to the monospectral image.

Means 3 using encoded data are connected at the output 25 of the encoding device 2.

The using means 3 comprise for example means for storing encoded data and/or means for transmitting encoded data.

The encoding device 2 comprises conventionally, starting from the input 24, a transformation circuit 21 which implements decompositions of the data signal into frequency sub-band signals, so as to perform an analysis of the signal.

The transformation circuit 21 is connected to a quantization circuit 22. The quantization circuit implements a quantization which is known per se, for example a scalar quantization, or a vector quantization, of the coefficients, or groups of coefficients, of the frequency sub-band signals supplied by the circuit 21.

Circuit 22 is connected to an entropy encoding circuit 23, which performs an entropy encoding, for example a Huffman encoding, or an arithmetic encoding, of the data quantized by circuit 22.

Figure 4A:
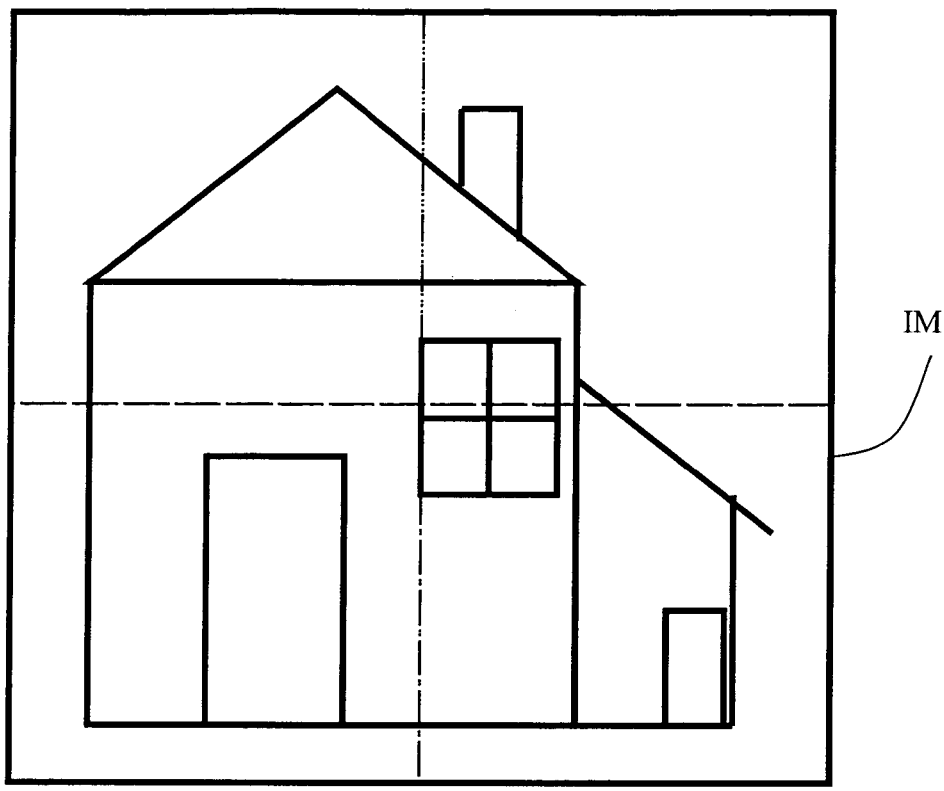
FIG. 4a is a diagram of a digital image IM output from the image source 1 of the device of FIG. 3.

FIG. 4a is a diagram of digital image IM output from the image source 1 of a device such as the one which has just been described with reference to FIG. 3.

This image is decomposed by the transformation circuit 21 of the device of FIG. 3, which is a circuit for dyadic decomposition into three decomposition levels.

Circuit 21 is, in this embodiment, a conventional set of filters, respectively associated with decimators by two, which filter the image signal according to two directions, into high and low spatial frequency sub-band signals. The relationship between a high-pass filter and a low-pass filter may be determined by the conditions for perfect reconstruction of the signal. It should be noted that the vertical and horizontal decomposition filters are not necessarily identical, although in practice this is generally the case. Circuit 21 comprises here three successive analysis blocks for decomposing the image IM into sub-band signals according to three decomposition levels.

Generally, the resolution of a signal is the number of data items per unit length used for representing that signal. In the case of an image signal, the resolution of a sub-band signal is related to the number of data items per unit length used for representing that sub-band signal horizontally and vertically. The resolution depends on the number of decompositions made, the decimation factor and the initial image resolution.

The first analysis block receives the digital image signal IM and, in a known manner, outputs four sub-band signals $LL_3$, $LH_3$, $HL_3$ and $HH_3$ of the highest resolution $RES_3$ in the decomposition (see FIG. 4b described below).

The sub-band signal $LL_3$ comprises the components, or data, of low frequency, in both directions, of the image signal. The sub-band signal $LH_3$ comprises the image signal components of low frequency in a first direction and of high frequency in a second direction. The sub-band signal $HL_3$ comprises the components of high frequency in the first direction and the components of low frequency in the second direction. Finally, the sub-band signal $HH_3$ comprises the components of high frequency in both directions.

Each sub-band signal is a set of real data (this could also be integers) constructed from the original image, which contains information corresponding to a respectively vertical, horizontal and diagonal orientation of the content of the image, in a given frequency band.

The sub-band signal $LL_3$ is analyzed by an analysis block similar to the previous one in order to supply four sub-band signals $LL_2$, $LH_2$, $HL_2$ and $HH_2$ of resolution level $RES_2$.

Each of the signals of the sub-bands of resolution $RES_2$ also corresponds to an orientation in the image.

The sub-band signal $LL_2$ is analyzed by an analysis block similar to the previous one in order to supply four sub-band signals $LL_0$ (by convention), $LH_1$, $HL_1$ and $HH_1$ of resolution level $RES_1$. It should be noted that the sub-band $LL_0$ by itself forms the resolution $RES_0$.

Each of the signals of the the sub-bands of resolution $RES_1$ also corresponds to an orientation in the image.

Figure 4B:
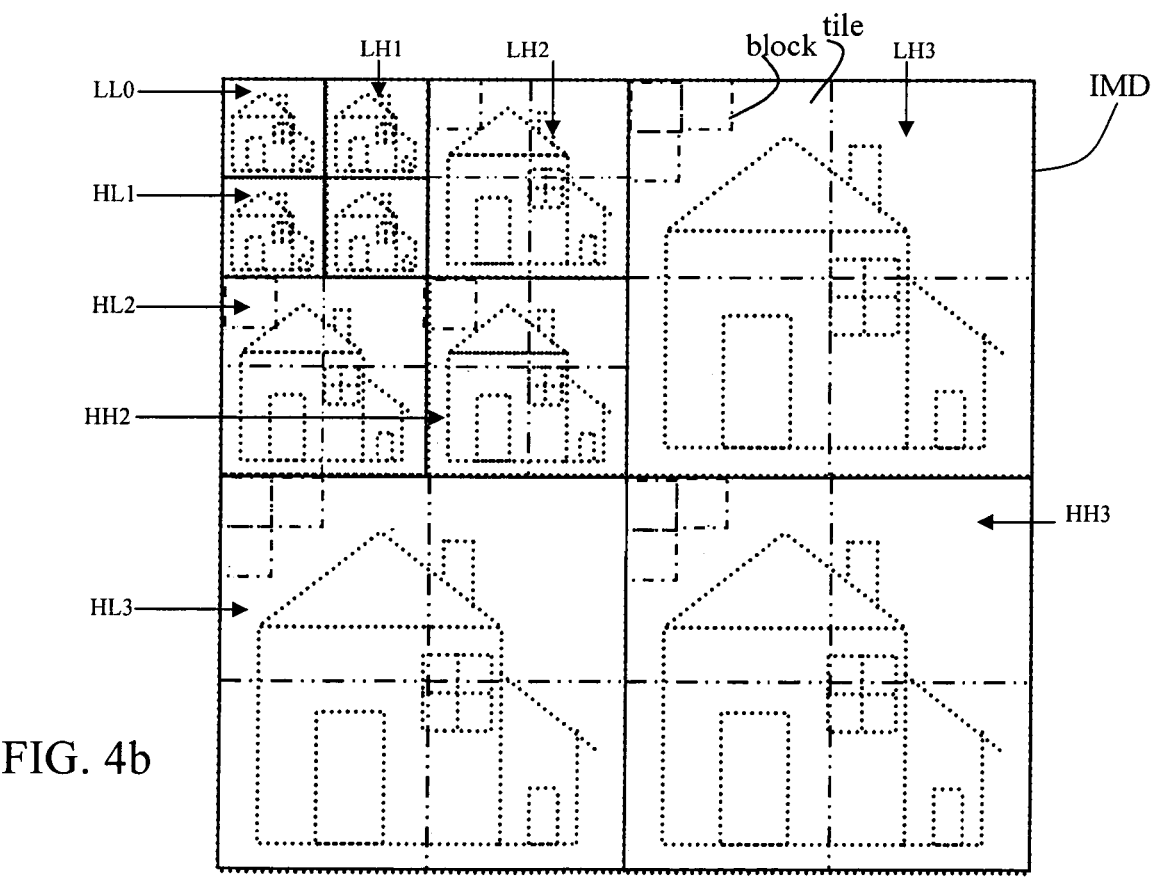
FIG. 4b is a diagram of an image IMD resulting from the decomposition of the image IM by the transformation circuit 21 of the device of FIG. 3.

FIG. 4b shows the image IMD resulting from the decomposition of the image IM, by the circuit 21, into ten sub-bands and according to four resolution levels: $RES_0$ ($LL_0$), $RES_1$ ($LL_2$), $RES_2$ ($LL_3$), $RES_3$ (original image). The image IMD contains as much information as the original image IM, but the information is divided in frequency according to three decomposition levels.

Naturally the number of decomposition levels and consequently of sub-bands can be chosen differently, for example 16 sub-bands over six resolution levels, for a bidimensional signal such as an image. The number of sub-bands per resolution level can also be different. In addition, it is possible for the decomposition not to be dyadic. The analysis and synthesis circuits are adapted to the dimension of the signal processed.

In FIG. 4b, the data resulting from the transformation are arranged sub-band by sub-band.

It will be noted that the image IM in FIG. 4a is for example separated into zones, referred to as tiles, only some of which have been shown in order not to clutter the drawing. When the image is decomposed by the circuit 21, this image can be decomposed tile by tile.

By collecting together in the same drawing the different images resulting from the tile by tile decomposition of the image IM, the result is the image IMD of FIG. 4b, on which the tiles appear.

In addition, each tile of the image IMD is partitioned into data blocks, some of which are represented in FIG. 4b.

It should be noted that partitioning the image into tiles is not necessary for implementing the invention.

In that case, the image is then only partitioned into data blocks.

The circuit 2 of the device of FIG. 3, which comprises the circuits 21 of transformation, 22 of quantization and 23 of entropy encoding is applied independently to each tile considered. The image signal encoded by the circuit 2 thus conveys blocks of data obtained by encoding of the original data and which constitute the bitstream.

The encoded image signal also comprises header information. The header information of the encoded signal make it possible, as soon as the latter is received and read, to have information on the encoding of the signal.

The image signal is organized into quality layers: the image can be decoded without taking into account the higher quality layers, each additional quality layer comprising data for a finer decoding of the image.

In the encoded digital image signal, the data are arranged in data packets $P(r,q)$, where r and q are integers representing respectively the resolution and the quality layer of the packet.

Figure 4C:
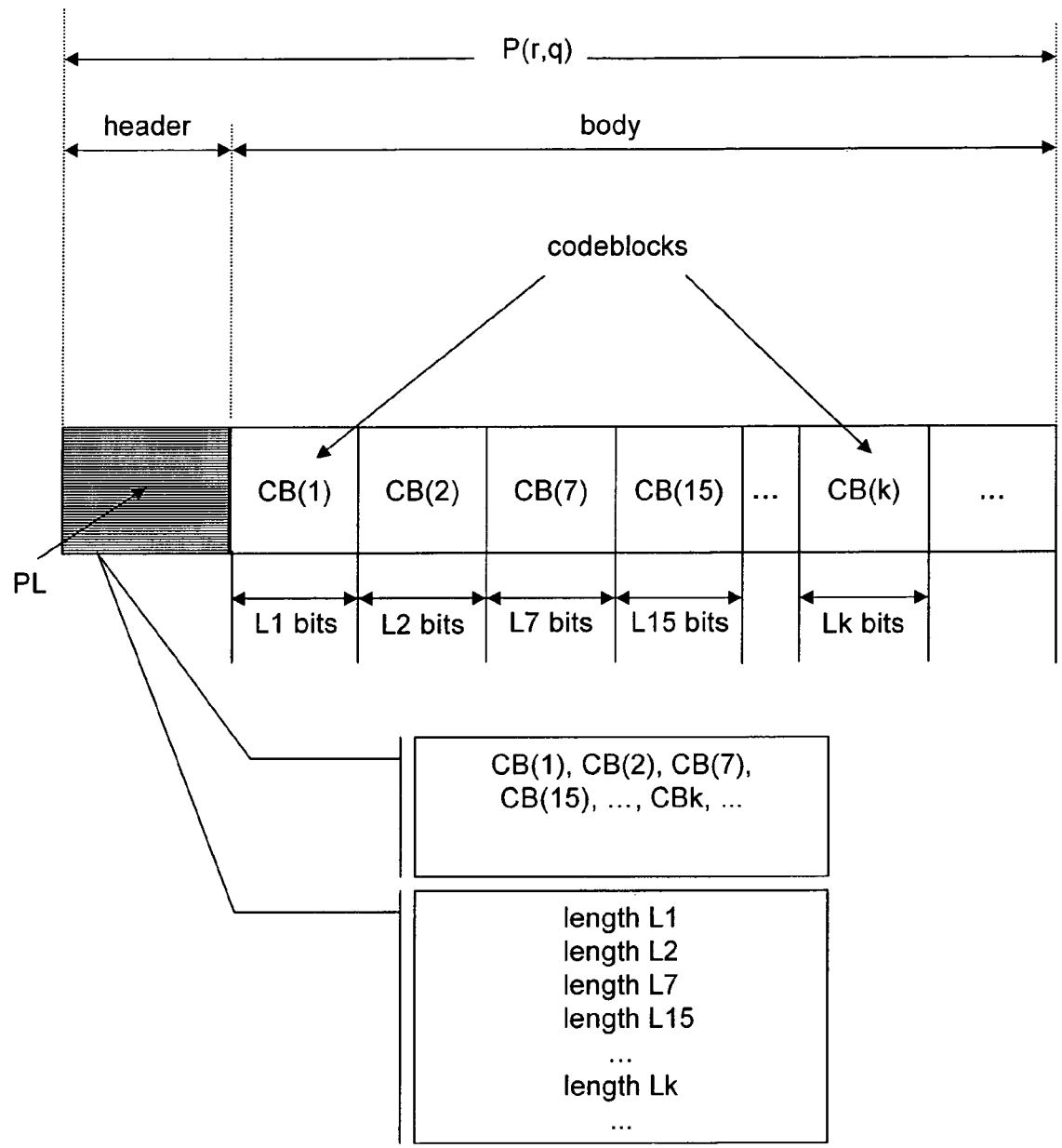
FIG. 4c is a diagram of a data packet of the type manipulated in the present invention.

Such a data packet $P(r,q)$ is represented in FIG. 4c. A packet comprises all the data relating to a specific tile, a specific quality layer, a specific component, a specific resolution, and a specific zone of the image.

This packet contains a list PL (packet length) which forms part of the header information mentioned above, and a packet body. This list PL describes the content of the data included in the packet body and a series of encoding data CB of each of the data blocks, at the resolution r and for the quality layer q.

The list PL gives the list of the blocks actually present in the packet and parameters concerning each block. The encoding data CB of a block are called a codeblock. In particular, the list PL gives the total length in bits Lk of each codeblock CB(k), that is to say, the quantity of data contained in the codeblock. The total length in bits for the packet itself is very easily deduced therefrom.

FIG. 5a represents the graphical interface provided for the content creator. Four parts can be seen: zones Z1, Z2, Z3 and Z4.

Zone Z1 is the display zone of the image, of constant maximum size whatever the resolution. If the size of the image at a given resolution exceeds that zone, only a portion of the image is displayed. This zone enables the content creator to judge the quality of an image for given parameters.

Zone Z2 represents, for the resolution selected by the content creator, the size of the file containing the image, as a function of the number of quality layers selected. For each quality mode, a cursor indicates the number of quality layers associated along the x-axis and the corresponding size along the y-axis. Zone Z2 is updated at step S4 of FIG. 1. This zone enables the content creator to have information on the rate corresponding to each quality mode. The rate, denoted T(R, Q), corresponds to the volume of data for an image of resolution R with Q quality layers. This calculation is detailed further on in relation with FIG. 6.

The zone Z3 makes it possible to modify the display resolution and possibly the position in the image. The keys + and − represent action buttons for "zooming in" or "zooming out", that is to say for increasing or reducing the resolution. The arrows represent action buttons for moving within the image when the image display resolution does not enable the entire image to be displayed in zone Z1. Each action on zone Z3 thus corresponds to step S7 of FIG. 1 and triggers the steps S3, S4, S5 and S6 and thus the updating of the display of the image in zone Z1 and of the corresponding information in zone Z2. It may be noted that in case of movement within the image, the information of zone Z2 do not change.

Zone Z4 displays the information on the number of layers corresponding to each quality mode and enables the content creator to vary the number of quality layers associated with each quality mode. A quality mode is represented by a cursor, the position of the cursor defining the associated number of layers. In this example, which is in no way limiting, there are eight quality layers in the image and it is desired to define three quality modes F ("low"), N ("normal") and E ("high"). Initially, the position of the cursors corresponds to the default values calculated at step S3 of FIG. 1. In the example, the "low" mode corresponds to 2 quality layers, the "normal" mode, to 6 layers and the "high" mode, to 8 layers. If the content creator wishes to view the display for a given quality mode, he selects that quality mode by selecting the corresponding cursor, the example by action on a mouse. If the content creator wishes to modify the number of layers for a quality mode, he performs the following steps:

select that quality mode by selecting the corresponding cursor, for example by action on the mouse, and use the progress bar to vary the position of the cursor and thus the number of layers associated with the mode.

The respective position of the cursors cannot change; for example, the movement of cursor N is limited by the position of the cursors F and E. Each modification of zone Z4 by the content creator corresponds to step S7 of FIG. 1 and thus triggers the steps S3, S4, S5 and S6 and thus the updating of the display of the image in zone Z1 and of the corresponding information in zone Z2.

This graphical interface thus provides the content creator with a set of information so that he can define the quality modes according to his own criteria. Thus, a content creator giving preference to compression in terms of file size will determine the quality modes as a function of zone Z2; a content creator giving preference to visual impression will use zone Z1; a creator wishing to reach a compromise between these two criteria will use zones Z1 and Z2 together, etc.

Furthermore, the content creator may give preference to a given image resolution to define the quality modes. Thus, if the default display resolution of the image in his animation is the lowest, he will be able to take account more particularly of rate and quality information for that resolution. Nevertheless, once the quality modes have been defined, they are independent of the resolution which will be chosen by the final user to view the animation.

FIG. 5b represents the graphical interface when the content creator, starting from the situation shown in FIG. 5a, increases the number of quality layers associated with the quality mode N.

Zone Z4 has been modified by the content creator: the number of quality layers associated with the mode N has passed from 6 to 7. This therefore triggers steps S3, S4, S5 and S6 of FIG. 1. Step S5, which corresponds to the updating of the display of the information, is illustrated in FIG. 5b in zone Z2 by the fact that the size of the file corresponding to mode N is then T(R,7). Step S6, which is the display of the image according to the parameters considered, is illustrated in zone Z1 by the fact that the decoded image shows more detail (smoke above the chimney, handle of the front door) since it takes into account an additional quality layer.

FIG. 5c represents the graphical interface when the content creator reduces the display resolution of the image through action on zone Z3 starting from the situation shown in FIG. 5b.

The action on zone Z3 has triggered the steps S3, S4, S5 and S6 of FIG. 1. Step S5, which corresponds to the updating of the display of the information, is illustrated in FIG. 5c in zone Z2 by the fact that the file sizes corresponding to each number of quality layers have been updated: the resolution having reduced, the file sizes have reduced also. The size of file corresponding to mode N for the resolution below is then T(R-1,7), the number of layers associated with mode N not having changed. Step S6, which is the display of the image according to the parameters considered, is illustrated in zone Z1 by the fact that the size of the image displayed is divided by 2.

Figure 6:
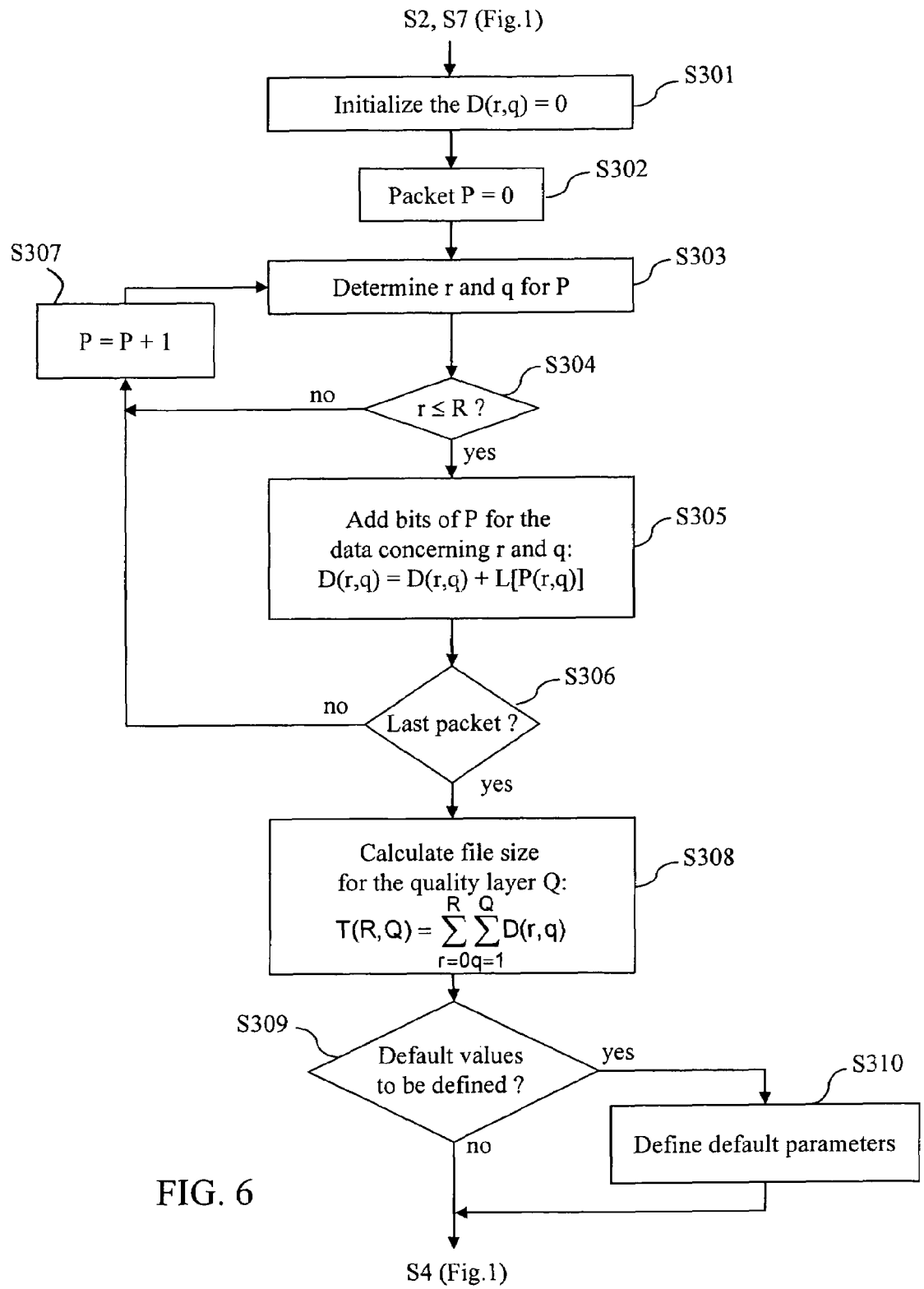
FIG. 6 is a flow diagram illustrating more precisely step S3 of FIG. 1, in a particular embodiment.

FIG. 6 illustrates more precisely the step S3 of analyzing the bitstream, described above in relation with FIG. 1.

The algorithm of FIG. 6 for a first portion relies on two loops, one inside the other, which make it possible to go through each data packet P(r,q) of the binary data stream making up the image signal and to deduce therefrom the volume of data for the resolution R and the number Q of quality layers.

During a step S301, which either follows step S2, or step S7 of FIG. 1, the initialization takes place of a set of variables D(r,q) to the value zero, D(r,q) representing the volume of data for a given resolution r and quality layer q. r is between 0 and R, a number corresponding to the resolution defined at step S2 or S7, and q is between 1 and Qmax, the maximum number of quality layers in the image.

Next, during a step S302, the index of the current packet P is initialized to 0, that is to say the binary stream is gone through as far as the first packet.

During the following step S303, the information obtained by reading the image header (step S1, FIG. 1)—type of progression in the image, total number of decompositions and total number of quality layers—make it possible to determine the resolution r and the quality layer q corresponding to P.

The following step S304 is a test to determine if the resolution r corresponding to the packet P is less than or equal to the display resolution R of the image:

in the negative, that packet is not considered and test S304 is followed by a step S307 which is described later;

in the affirmative, step S304 is followed by a step S305.

Step S305 consists of adding the quantity of data of the packet P to the quantity of data D(r,q) for the resolution r and the quality layer q. This operation is illustrated by the following formula: D(r,q)=D(r,q)+L[P(r,q)], where L[P(r,q)] represents the length, in bytes, of the packet P(r,q). It will be noted that this sum enables a quantity or volume of data to be attributed for a given resolution and number of quality layers.

This step S305 does not require any entropy decoding of the data, but just a rapid analysis of the header of the packet under consideration in order to determine the number of bits associated with the packet. It should be noted that systems for storing the lengths of the blocks of the packets in memory could be implemented for avoiding having to go through the encoded image signal file again in case a packet should be called upon several times during the course of different calculations.

The following step S306 is a test to determine if the packet currently being processed is the last packet of the binary stream:

in the affirmative, all the packets have been processed and step S306 is followed by a step S308 which is described later;

in the negative, step S306 is followed by the step S307.

Step S307 consists of incrementing the packet index by one unit: P=P+1. The binary stream is thus gone through as far as the next packet.

Step S308 consists of calculating, for the number of quality layers Q of the image, the size T of the file corresponding to the resolution R. This operation is illustrated by the formula:

$$T(R, Q) = \sum_{r=0}^{R} \sum_{q=1}^{Q} D(r, q).$$

This is because, to decode an image at a given resolution and quality, the lower resolutions and lower quality layers are needed. Here too, it should be noted that systems for storage in memory of file sizes could be implemented to avoid having to go through the file of the encoded image signal again, should the resolution R have already been processed earlier.

The following step S309 is a test to determine if default values must be defined, i.e. if step S3 is the consequence of:

step S2, and thus the default values will be defined at a step S310 described below;

step S7, and thus the number of quality layers has been determined by the content creator via the graphical interface and step S4 of FIG. 1 is passed on to.

Step S310 consists of determining a number of quality layers to associate with each quality mode, for the initialization of the graphical interface but also should the content creator not wish to be involved in the choice of the values. These default values are determined as follows:

for the high quality mode, all the quality layers are considered;

for the normal quality mode, the number of quality layers considered is the maximum number of layers such that the size of the file is less than or equal to ⅔ of the size of the file for all the quality layers considered;

for the low quality mode, the number of quality layers considered is the maximum number of layers such that the size of the file is less than or equal to ⅓ of the size of the file for all the quality layers considered.

These three cases are applicable in the general case, that is to say when there are more than three quality layers in the image. For the particular cases, the values are defined as follows:

if the image is organized according to three quality layers, the high mode corresponds to the 3 layers, the normal mode to 2 layers and the low mode to 1 layer;

if the image is organized according to two quality layers, the high mode corresponds to the 2 layers, the normal mode to 1 layer. If there is a lower resolution, the low mode corresponds to 1 quality layer in the lower resolution, otherwise the low and normal quality modes are identical;

if the image is organized according to a single quality layer, the same principle as for the previous item is utilized.

Thus, if the content creator decides not to redefine the quality modes, a criterion on the file size can be adopted. It is thus ensured, where possible, that according to the quality mode requested by the final user, a real difference in rate is observed for the transmission of the image to the final user.

The invention claimed is:

1. A method of defining qualities for a digital image signal encoded beforehand, comprising:

defining, by a content creator, a predetermined number of quality modes, each quality mode corresponding to a predetermined number of quality layers of the digital image signal, on the basis of rate information provided via a graphical interface and perception quality information provided to said content creator via a visualization of the digital image signal decoded, wherein a digital image in a given one of the quality modes is obtained by decoding the digital image signal encoded beforehand using said predetermined number of quality layers, and wherein only the quality modes defined by said content creator are made accessible to a final user, wherein the rate information is represented in the form of a graph illustrating the size of a decoded image as a function of the number of quality layers, and wherein the perception quality information is represented in the form of a cursor illustrating the number of layers corresponding to each quality mode, displayed simultaneously with the decoded digital image signal.

2. A method according to claim 1, wherein there are three quality modes, including a low quality mode, a normal quality mode, and a high quality mode.

3. A method according to claim 1, wherein each quality mode corresponds to the decoding of a predetermined quantity of data representing the digital image signal.

4. A method according to claim 1, further comprising:

storing the at least one decoding parameter in a file to be transmitted to a final user to deduce therefrom, according to the quality mode chosen by the user, the corresponding decoding parameter.

5. A method according to claim 4, wherein the file is in SWF format.

6. A method according to claim 1, further comprising:

an initializing step of determining default values of the predetermined number of quality layers to be associated with each quality mode, corresponding to mutually different quantities of data representing the digital image signal.

7. A method according to claim 1, wherein the digital image signal is a signal representing an image encoded according to the JPEG2000 standard.

8. A device for defining qualities for a digital image signal encoded beforehand, comprising:

means for defining, by a content creator, a predetermined number of quality modes each corresponding to a predetermined number of quality layers of the digital image signal, on the basis of rate information provided via a graphical interface and perception quality information provided to said content creator via a visualization of the digital image signal decoded, wherein a digital image in a given one of the quality modes is obtained by decoding the digital image signal encoded beforehand using said predetermined number of quality layers, and wherein only the predetermined number of quality modes defined by said content creator are made accessible to a final user, wherein the rate information is represented in the form of a graph illustrating the size of a decoded image as a function of the number of quality layers, and wherein the perception quality information is represented in the form of a cursor illustrating the number of layers corresponding to each quality mode, displayed simultaneously with the decoded digital image signal.

9. A device according to claim 8, wherein three are three quality modes, including a low quality mode, a normal quality mode, and a high quality mode.

10. A device according to claim 8, wherein each quality mode corresponds to the decoding of a predetermined quantity of data representing the digital signal.

11. A device according to claim 8, further comprising means for storing the at least one decoding parameter in a file to be transmitted to a final user to deduce therefrom, according to the quality mode chosen by the user, the corresponding decoding parameter.

12. A device according to claim 11, wherein the file is in SWF format.

13. A device according to claim 8, further comprising initializing means for determining default values of the predetermined number of quality layers to be associated with each quality mode, corresponding to mutually different quantities of data representing the digital signal.

14. A device according to claim 8, wherein the digital signal is a signal representing an image encoded according to the JPEG2000 standard.

* * * * *